(12) United States Patent
Baumann

(10) Patent No.: US 7,507,939 B2
(45) Date of Patent: Mar. 24, 2009

(54) COOKING APPARATUS HAVING A MICROWAVE GENERATOR

(75) Inventor: Udo Baumann, Hamburg (DE)

(73) Assignee: Electrolux Professional SpA, Pordenone (IT)

( * ) Notice: Subject to any disclaimer, the term of this patent is extended or adjusted under 35 U.S.C. 154(b) by 23 days.

(21) Appl. No.: 11/385,395

(22) Filed: Mar. 21, 2006

(65) Prior Publication Data

US 2006/0289514 A1 Dec. 28, 2006

(30) Foreign Application Priority Data

Apr. 19, 2005 (IT) .......................... PN2005A0023

(51) Int. Cl.
*H05B 6/72* (2006.01)
*H05B 6/80* (2006.01)

(52) U.S. Cl. .................. 219/732; 219/746; 219/756; 219/762; 219/725; 219/685; 99/451

(58) Field of Classification Search ......... 219/725–735, 219/759, 756, 762–763, 745–748, 685; 99/451, 99/325, DIG. 14
See application file for complete search history.

(56) References Cited

U.S. PATENT DOCUMENTS

| | | | | |
|---|---|---|---|---|
| 2,956,144 A | * | 10/1960 | Woodman | 219/756 |
| 3,731,037 A | * | 5/1973 | Levinson | 219/756 |
| 4,454,403 A | * | 6/1984 | Teich et al. | 219/729 |
| 5,180,895 A | * | 1/1993 | Briggs et al. | 219/697 |
| 5,736,718 A | * | 4/1998 | Levinson | 219/729 |
| 6,861,631 B2 | * | 3/2005 | Hahm et al. | 219/682 |

\* cited by examiner

*Primary Examiner*—Philip H Leung
(74) *Attorney, Agent, or Firm*—Pearne & Gordon LLP

(57) ABSTRACT

Apparatus for cooking food products on both sides thereof, including a base member (2) associated to a bottom heating surface (3) adapted to support food products to be cooked, an upper member (4) associated to a top heating surface (5) and joined in an articulated manner to the base member (2) so that, when the upper member (4) is displaced towards the base member (2), the top heating surface (5) comes to lie opposite to the bottom heating surface (3) so as to enclose the food products therebetween. The upper member (4) is adapted to close in onto the base member (2) so as to form a cooking cavity (6) containing the heating surfaces (3, 5), wherein the cooking cavity (6) defines a radiation shield capable of retaining the microwaves inside the cooking cavity (6) itself.

15 Claims, 3 Drawing Sheets

COOKING APPARATUS HAVING A MICROWAVE GENERATOR

The present invention refers to an apparatus used to cook food products on both sides thereof.

Widely known in the art are currently broilers, or griddles, that are used to cook food products of the most varied kind, such as hamburgers, toasted rolls, meat in general, and the like. These griddles use contact heating or infrared radiation as a process to cook such products. The heating surfaces are made of chromium-plated steel, stainless steel, Teflon-coated steel or glass-ceramics. A number of griddles to be found currently on the marketplace have—further to a lower or bottom heating element on which the products to be cooked are placed—an upper or top heating element that is adapted to be brought in proximity of the lower or bottom one so as to have the products cooked on both sides simultaneously, thereby reducing the overall time required to handle the same products.

Apparatuses of this kind, however, have a main drawback in that they are not capable of cooking the food products completely; in fact, such products are usually just heated up or browned outside, while remaining substantially uncooked, i.e. in their raw state, inside.

In view of doing away with such drawback, a solution is generally found in a correspondingly increased cooking time, with the result, however, that a number of products end up by overcooking and scorching on the outside. This has again a disadvantage of causing the cooking, i.e. preparation time to become excessively long, while consumers are ultimately served scarcely appealing and no longer tasty food.

Another drawback encountered with prior-art apparatuses of the above-cited kind lies in the fact that the food cooking process itself cannot practically be controlled, so that it is not possible to select between a cooking process adapted to make a food product crisper and a cooking process that on the contrary is adapted to prepare juicier food products.

It therefore is a main object of the present invention to provide an apparatus for cooking food products on both sides thereof, which does effectively away with the typical drawbacks of prior-art equipment as noted above.

Within this general object, it is a purpose of the present invention to provide an apparatus of the above-cited kind, which has an improved cooking ability and uses shorter cooking times as compared to apparatuses of the same kind to be currently found on the marketplace.

It is another purpose of the present invention to provide an apparatus of the above-cited kind, which is versatile enough to make it possible for different kinds of food products to be processed, i.e. cooked in an adequate manner.

Still another purpose of the present invention is to provide an apparatus of the above-cited kind, which is simple in its construction and reliable in its use, as well as manufacturable at competitive costs.

According to the present invention, these aims, along with further ones that will become apparent from the following disclosure, are reached in an apparatus incorporating the features as defined and recited in the claims 1 et seq. appended hereto.

Features and advantages of the present invention will anyway be more readily understood from the description of a preferred, although not sole embodiment that is given below by way of non-limiting example with reference to the accompanying drawings, in which.

Figure 1:
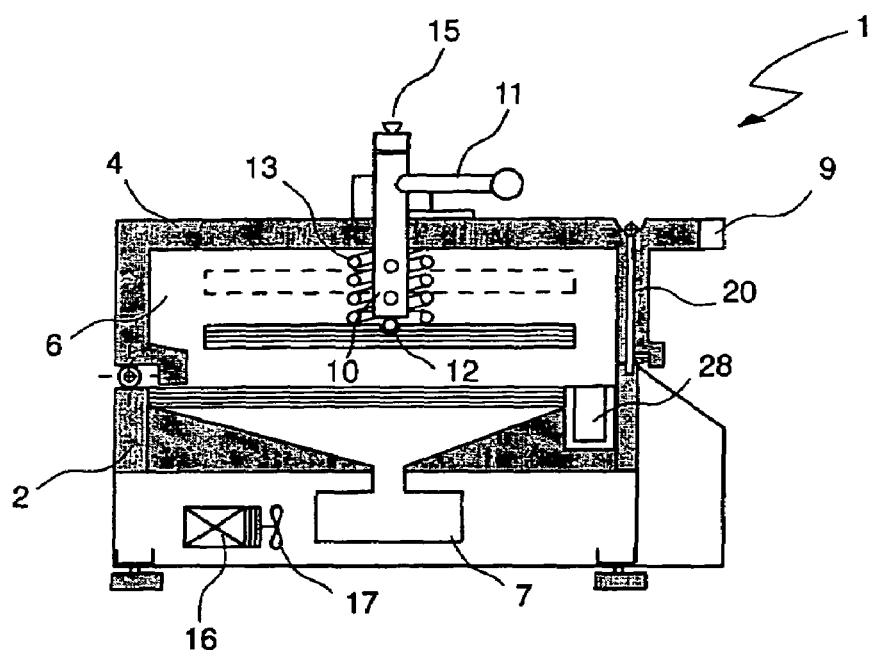
FIG. 1 is a side elevational view of an apparatus according to the present invention, as shown in the closed state thereof.
Figure 2:
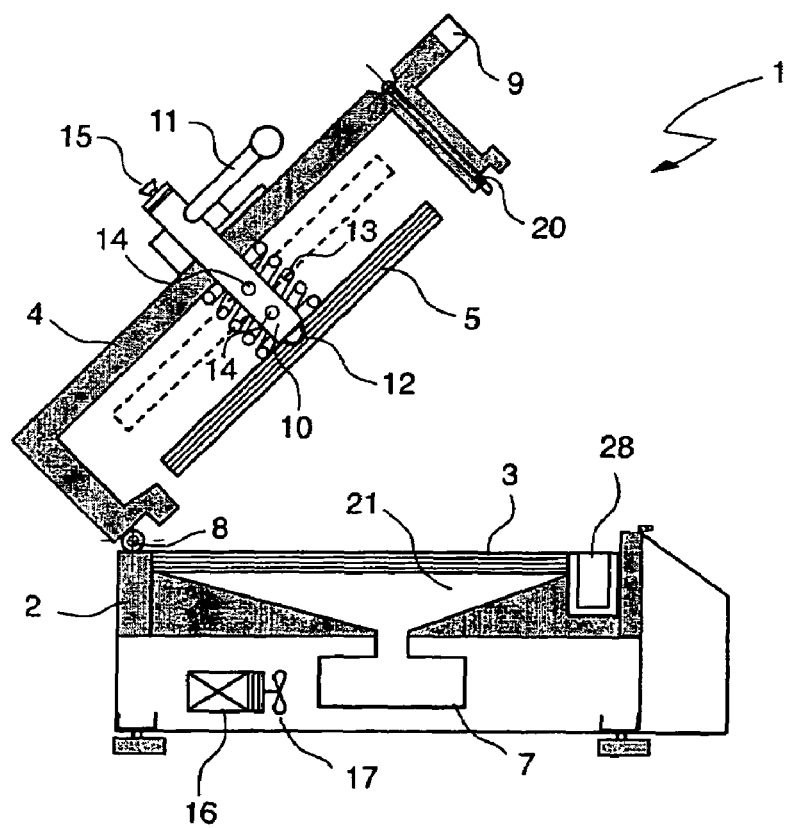
FIG. 2 is a similar view as the previous one, showing the apparatus in the open state thereof.
Figure 3:
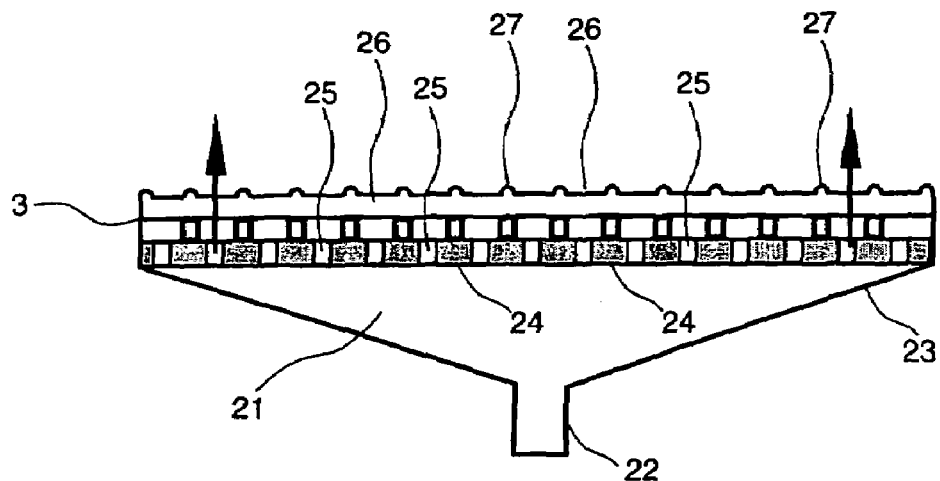
FIG. 3 is a side elevational view of the lower or bottom heating surface.
Figure 4:
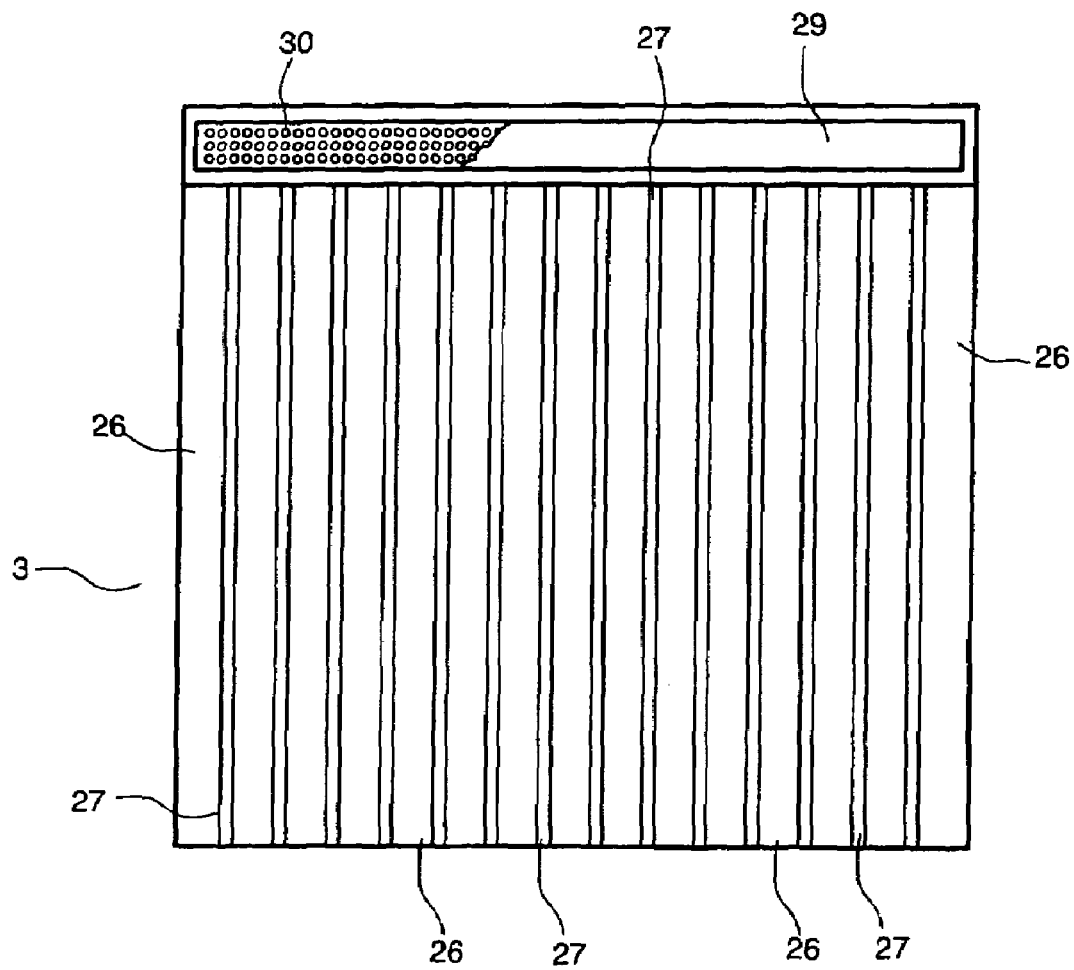
FIG. 4 is a top view of the lower or bottom heating surface.
Figure 5:
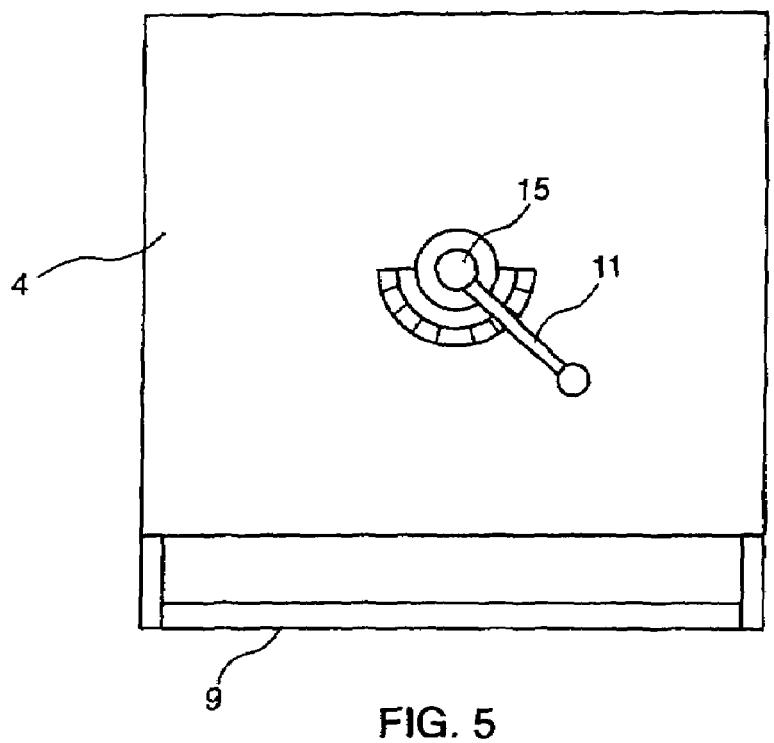
FIG. 5 is a top view of the apparatus according to the present invention.
Figure 6:
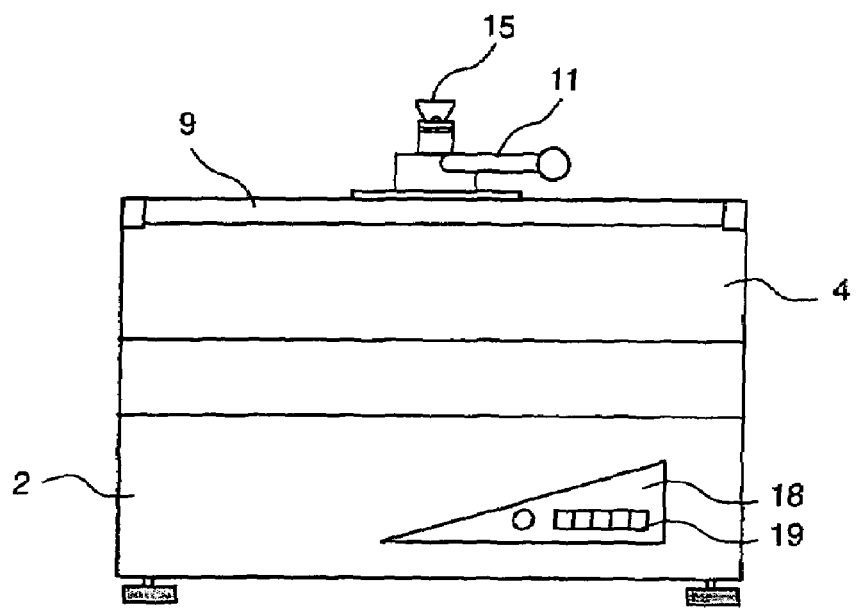
FIG. 6 is a side elevational view of the apparatus according to the present invention.

With reference to the above-cited figures, the apparatus for cooking food products on both sides thereof according to the present invention—as indicated generally at 1 in the figures—comprises a base member 2 associated to a lower or bottom heating surface 3 adapted to support food products to be cooked, an upper member 4 associated to an upper or top heating surface 5 and pivotally joined to the base member 2 so that, when the upper member 4 is displaced towards the base member 2, the top heating surface 5 comes to lie opposite to the bottom heating surface 3 so as to enclose the food products therebetween.

The upper member 4 is adapted to close in onto the base member 2 so as to form a cooking cavity 6 containing the heating surfaces 3, 5. In addition, the base member 2 comprises a microwave generator 7 adapted to irradiate the food products being enclosed between the heating surfaces 3, 5 and the cooking cavity 6 itself defines a radiation shield capable of retaining microwaves inside the same cooking cavity 6.

The base member 2 comprises a compartment provided to accommodate the microwave generator 7, the power-supply unit for the same generator and the control electronics for both the generator and the power supply. The bottom heating surface 3 substantially closes the upper portion of the accommodating compartment of the base member 2, so that the microwave generator 7, the power supply and the control electronics are located in said accommodating compartment below the bottom heating surface 3.

The upper member 4 comprises a frame that is coupled to the top heating surface 5 and joined in an articulated manner to the accommodating compartment of the base member 2 via proper joint means 8, so that the frame of the upper member 4 is movable, relative to said accommodating compartment of the base member 2, between an open condition, in which the bottom heating surface 3 of the base member 2 is accessible from the outside for the food products to be cooked to be capable of being laid thereupon, and a closed condition, in which the frame of the upper member 4 is closed onto the accommodating compartment of the base member 2 so as to define the cooking cavity containing the heating surfaces 3, 5.

The frame of the upper member 4 comprises a handgrip member 9, by means of which it is possible for the same frame to be raised and lowered between the open condition and the closed condition as mentioned above.

The top heating surface 5 is associated to the frame of the upper member 4 by means of at least a moving member 10 enabling the top heating surface 5 to be adjustably moved into positions at a different height from the bottom heating surface 3 in accordance with the size of the food products to be cooked each time. Such moving member 10 comprises a rod disposed inside the cooking cavity 6 and connected to an adjustment device 11 that is accessible on the outside of the same cooking cavity 6 at a top portion of the frame of the upper member 4. Such adjustment device 11 acts on the rod of said moving member 10 so as to displace said rod inside the cooking cavity 6 in view of adjusting the distance of the top heating surface 5 from the bottom heating surface 3 in accordance with the varying sizes of the food products to be cooked. The adjustment device 11 comprises a turning knob connected to a threaded bush, which the rod of the moving member 10 is adapted to screw in, in the way of a screw-and-nut coupling, so as to adjust the position of the rod of the moving member 10 inside the cooking cavity in view of causing the top heating surface to come into contact with, i.e. come to rest against the food products to be cooked in a most adequate manner. Different angular positions of the knob of the adjustment device 11 correspond to different positions of the rod of the moving member 10 inside the cooking cavity.

The top heating surface 5 is hinged on the rod of the moving member 10 via a ball joint 12 so as to allow the top heating surface 5 to adapt to variously sized food products. Elastic means 13 are provided to bias and stabilize the top heating surface 5—connected to the rod of the moving member 10—against the food products.

In detail, such elastic means 13 comprise a helical spring arranged around the rod of the moving member 10 and engaging against the frame of the upper member 4, on a side, and against the top heating surface 5 on the opposite side. Advantageously, the rod of the moving member 10 defines a duct enabling the steam that forms during cooking to be exhausted outside and the humidity inside the cooking cavity to be properly adjusted. Inflow perforations 14 are provided in the rod of the moving member 10, through which the steam generating inside the cooking cavity 6 is able to flow into and through the duct defined by the rod of the moving member 10. A safety valve 15 connected to the rod of the moving member 10 is provided so as to control the flow of steam from the interior of the cooking cavity 6 to the outside atmosphere. This safety valve 15 is accessible from the outside of the same cooking cavity 6 so as to enable it to be properly opened/closed, as required. In this way, it is therefore possible for the pressure and the humidity level inside the cooking cavity 6 to be adjusted according to actual needs. In particular, by opening the valve 15 the effect is obtained of having a lower pressure and a low-humidity environment in the cooking cavity, whereas a higher pressure and a moist environment are obtained when said valve is closed.

Housed in the base member 2—below the bottom heating surface 3—there are a microwave generator 7 of the magnetron type, a power-supply transformer 16 for the same generator, and a cooling fan 17—powered from said transformer 16—adapted to cool down said magnetron microwave generator 7. An electronic control panel 18, with the related electronic controls 19, is provided on the base member 2 for the different cooking programs to be set in accordance to the food products to be handled.

An interlock switch 20 is adapted to allow the microwave generator 7 to solely operate when the frame of the upper member 4 is correctly closed against the accommodating compartment of the base member 2.

The microwave generator 7 is coupled to waveguide means 21 adapted to guide the propagation of the microwaves at and along the bottom heating surface 3. In turn, this bottom heating surface 3 is adapted to let the microwaves pass therethrough so as to eventually hit the food products resting upon said bottom heating surface 3 inside the cooking cavity 6.

The waveguide means 21 comprise a waveguide cavity in the shape of substantially a funnel having a tapered portion 22 coupled to the microwave generator and a flared portion 23 closed at the top by a reflector 24 arranged close to the bottom heating surface 3 in a position below the latter. The reflector 24 is provided with a plurality of slots 25, through which the microwaves are able to rise up out of the waveguide cavity 21 to pass through microwave-transparent portions 26 of the bottom heating surface 3 and radiate into the cooking cavity 6.

The bottom heating surface 3 comprises a microwave-transparent surface, preferably of glass-ceramic material, and a plurality of heating elements 27 arranged on the transparent surface.

The slots 25 of the reflector 24 are provided in correspondence to the portions 26 of the bottom heating surface 3 that are clear of heating elements 27, so that the microwaves are able to pass through the microwave-transparent bottom heating surface 3 without being absorbed by the heating elements 27.

The slots 25 of the reflector 24 are so sized as to be able to convey the totality of the microwaves rising up from the waveguide cavity 21 through the microwave-transparent portions 26, thereby preventing any diffraction occurrence.

In the embodiment of the present invention being discussed by way of example, the heating elements 27 are arranged parallel to and spaced from each other on the microwave-transparent surface of the bottom heating surface 3, whereas the slots 25 of the reflector 24 are provided in correspondence to and below the microwave-transparent portions 26 of the bottom heating surface 3 that are comprised between, i.e. lie within contiguous heating elements 27.

The bottom heating surface 3 comprises a channel 28 defining a first portion 29, which is adapted to collect the liquid cooking residues, and a second portion 30 that is closed on top by means of a perforated cover 31 and is adapted to contain water. The water contained in the second portion of the channel is adapted to be heated up by the microwaves, thereby generating steam aimed at taking part in the cooking process so as to assist in reducing the cooking time and the weight losses by the food products being cooked.

Fully apparent from the above description is therefore the ability of the present invention to effectively reach the aforecited aims and advantages by providing an apparatus for cooking food products on both sides thereof, which is capable of efficiently and effectively cooking the food products involved, without affecting the taste and flavor thereof.

A particular advantage of the apparatus according to the present invention is the ability thereof to allow for extremely short cooking times, while doing away with the risk for the food products being handled to get scorched.

Another advantage of the apparatus according to the present invention derives from the ability thereof to enable most variously sized food products to be cooked there, thanks to the top heating surface thereof being adjustable.

A further advantage of the apparatus according to the present invention lies in the ability thereof to enable the humidity in the cooking cavity to be adjusted through the operation of the specially provided safety valve and the evaporation of the water contained in the second portion of the channel in the bottom heating surface. In this way, the possibility arises for crisper or juicer food products to be obtained as needed or required.

Yet a further advantage of the apparatus according to the present invention derives from the fact that the bottom heating surface is simple and most convenient to clean, thanks to the provision of the first portion of the channel in the same bottom heating surface.

It will be readily appreciated that the inventive apparatus as described above may be subject to a number of modifications and may be embodied in a number of different manners without departing from the scope of the present invention, as defined in the appended claims. Furthermore, it will be appreciated that all items entering the construction of the above-described apparatus may be replaced by technically equivalent elements, arrangements and parts.

It should be finally noticed that the materials used, as well as the shapes and the sizing of the individual items of the apparatus of the invention, may each time be selected so as to more appropriately meet the particular requirements or suit the particular application.

The invention claimed is:

1. Apparatus for cooking food products on both sides thereof, comprising a base member (2) associated to a bottom heating surface (3) adapted to support food products to be cooked, an upper member (4) associated to a top heating surface (5) and joined in an articulated manner to the base member (2) so that, when the upper member (4) is displaced towards the base member (2), the top heating surface (5) comes to lie opposite to the bottom heating surface (3) so as to enclose the food products therebetween, wherein the upper member (4) is adapted to close in onto the base member (2) so as to form a cooking cavity (6) containing said heating surfaces (3, 5), the base member (2) comprising a microwave generator (7) adapted to irradiate the food products being enclosed between said heating surfaces (3, 5), said cooking cavity (6) defining a radiation shield capable of retaining the microwaves inside said cooking cavity (6) itself, said microwave generator being coupled to waveguide means arranged below the bottom heating surface and adapted to guide the propoagation of the microwaves at and along the bottom heating surface, said bottom heating surface being adapted to let the microwave pass therethrough so as to hit the food products resting upon said bottom heating surface inside the cooking cavity, said bottom heating surface comprising a plurality of heating elements.

2. Apparatus according to claim 1, wherein said waveguide means (21) comprise a waveguide cavity closed at the top by a reflector (24) arranged close to the bottom heating surface (3) in a position below the latter.

3. Apparatus according to claim 2, wherein said reflector (24) is provided with a plurality of slots (25), through which the microwaves are able to rise up out of the waveguide cavity (21) to pass through microwave-transparent portions (26) of the bottom heating surface (3) and radiate into the cooking cavity (6).

4. Apparatus according to claim 3, wherein said slots (25) of the reflector (24) are provided in correspondence to the portions (26) of the bottom heating surface (3) that are clear of heating elements (27), so that the microwaves are able to pass through the microwave-transparent bottom heating surface (3) without being absorbed by the heating elements (27).

5. Apparatus according to claim 1, wherein said base member (2) comprises a compartment provided to accommodate the microwave generator (7), wherein said bottom heating surface (3) substantially closes the upper portion of this accommodating compartment of the base member (2), so that the microwave generator (7) is located in said accommodating compartment below the bottom heating surface (3).

6. Apparatus according to claim 1, wherein said top heating surface (5) is associated to the upper member (4) by means of at least a moving member (10) enabling the top heating surface (5) to be adjustably moved into positions at a different height from the bottom heating surface (3) in accordance with the size of the food products to be cooked each time.

7. Apparatus according to claim 6, wherein said moving member (10) is connected to an adjustment device (11) that is accessible on the outside of the cooking cavity (6), said adjustment device (11) acting on the moving member (10) so as to displace the latter inside the cooking cavity (6) in view of adjusting the distance of the top heating surface (5) from the bottom heating surface (3) in accordance with the varying sizes of the food products to be cooked.

8. Apparatus according to claim 7, wherein said moving member (10) comprises a rod disposed inside the cooking cavity (6).

9. Apparatus according to claim 8, wherein said top heating surface (5) is hinged on the rod of the moving member (10) via a ball joint (12) so as to allow the top heating surface (5) to adapt to variously sized food products.

10. Apparatus according to claim 9, wherein elastic means (13) are provided to bias and stabilize the top heating surface (5) against the food products.

11. Apparatus according to claim 8, wherein said rod of the moving member (10) defines a duct enabling the steam that forms during cooking to be exhausted outside and the humidity inside the cooking cavity to be adjusted.

12. Apparatus according to claim 11, wherein inflow perforations (14) are provided in the rod of the moving member (10), through which the steam generating inside the cooking cavity (6) is able to flow into and through the duct defined by the rod of the moving member (10).

13. Apparatus according to claim 12, wherein safety valve means (15) connected to the rod of the moving member (10) are provided to control the flow of steam from the interior of the cooking cavity (6) to the outside atmosphere.

14. Apparatus according to claim 1, wherein an interlock switch (20) is provided to allow the microwave generator (7) to solely operate when the upper member (4) is correctly closed against the accommodating compartment of the base member (2).

15. Apparatus according to claim 1, wherein said bottom heating surface (3) comprises containing provisions (28, 29) adapted to be hit by the microwaves so as to heat up water contained therein and generate steam.

* * * * *